(12) United States Patent
Okada et al.

(10) Patent No.: US 10,811,715 B2
(45) Date of Patent: Oct. 20, 2020

(54) FUEL-CELL UNIT CELL AND MANUFACTURING METHOD THEREFOR

(71) Applicant: TOYOTA JIDOSHA KABUSHIKI KAISHA, Toyota-shi, Aichi-ken (JP)

(72) Inventors: Sachio Okada, Shizuoka-ken (JP); Takuya Kurihara, Miyoshi (JP); Fumishige Shizuku, Seto (JP); Ryogo Murayama, Toyota (JP); Makoto Kamiya, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/823,576

(22) Filed: Mar. 19, 2020

(65) Prior Publication Data

US 2020/0220191 A1    Jul. 9, 2020

Related U.S. Application Data

(62) Division of application No. 15/626,739, filed on Jun. 19, 2017, now Pat. No. 10,637,086.

(30) Foreign Application Priority Data

Jul. 25, 2016  (JP) .................................. 2016-145133

(51) Int. Cl.
*H01M 8/1004* (2016.01)
*H01M 8/0286* (2016.01)
(Continued)

(52) U.S. Cl.
CPC ....... *H01M 8/1004* (2013.01); *H01M 8/0267* (2013.01); *H01M 8/0273* (2013.01);
(Continued)

(58) Field of Classification Search
None
See application file for complete search history.

(56) References Cited

U.S. PATENT DOCUMENTS

| 6,426,138 B1 | 7/2002 | Narushima et al. |
| 2002/0064703 A1 | 5/2002 | Mizuno |

(Continued)

FOREIGN PATENT DOCUMENTS

| EP | 1876666 A1 | 1/2008 |
| EP | 2584636 A1 | 4/2013 |

(Continued)

OTHER PUBLICATIONS

Partial machine translation of Haruta (JP 2014222610 A). (Year: 2019).

*Primary Examiner* — Magali P Slawski
(74) *Attorney, Agent, or Firm* — Dickinson Wright PLLC (57) ABSTRACT

A fuel-cell unit cell comprises an MEGA plate with a resin frame, and two separators. There is formed a gas manifold hole in an outer edge portion of the resin frame. There is provided a gas-flow-path forming portion with a recessed-and-protruded shape on the first surface of the resin frame for forming gas flow paths between the gas manifold hole and the first surface of the MEGA. There is also formed a fusion-bonding portion for surrounding a periphery of the gas manifold hole to cut off gas circulation between the gas manifold hole and the second surface of the MEGA and for bonding the resin frame and the second separator with each other, on the second surface of the resin frame so as to pass across a backside of the gas-flow-path forming portion. The fusion-bonding portion is formed from a first resin, and the gas-flow-path forming portion is formed from a second resin higher in melting point than the first resin.

4 Claims, 8 Drawing Sheets

(51) Int. Cl.
| | |
|---|---|
| *H01M 8/0273* | (2016.01) |
| *H01M 8/0284* | (2016.01) |
| *H01M 8/0297* | (2016.01) |
| *H01M 8/0267* | (2016.01) |
| *H01M 8/248* | (2016.01) |

(52) U.S. Cl.
CPC ....... *H01M 8/0284* (2013.01); *H01M 8/0286* (2013.01); *H01M 8/0297* (2013.01); *H01M 8/248* (2013.01); *Y02P 70/56* (2015.11)

(56) References Cited

U.S. PATENT DOCUMENTS

| | | |
|---|---|---|
| 2008/0305384 A1 | 12/2008 | Kawashima et al. |
| 2009/0286121 A1 | 11/2009 | Morimoto et al. |
| 2010/0173226 A1 | 7/2010 | Oomori et al. |
| 2011/0003232 A1 | 1/2011 | Obika |
| 2011/0311898 A1 | 12/2011 | Yamauchi et al. |
| 2012/0258377 A1 | 10/2012 | Sugita |
| 2013/0071769 A1 | 3/2013 | Ikezoe et al. |
| 2014/0017593 A1 | 1/2014 | Abe et al. |
| 2016/0181630 A1 | 6/2016 | Bauer et al. |
| 2018/0375215 A1 | 12/2018 | Nagamune |
| 2019/0207220 A1 | 7/2019 | Cho |

FOREIGN PATENT DOCUMENTS

| | | |
|---|---|---|
| JP | 2009-211813 A | 9/2009 |
| JP | 2012-212560 A | 11/2012 |
| JP | 2013-084352 A | 5/2013 |
| JP | 2014-222610 A | 11/2014 |
| JP | 2015-133269 A | 7/2015 |
| WO | 2011/083548 A1 | 7/2011 |
| WO | 2011/158551 A1 | 12/2011 |

FUEL-CELL UNIT CELL AND MANUFACTURING METHOD THEREFOR

CROSS REFERENCE TO RELATED APPLICATIONS

This application is a divisional of U.S. application Ser. No. 15/626,739, filed Jun. 19, 2017, which claims priority to Japanese Patent Application No. 2016-145133 filed on Jul. 25, 2016, the entire contents of which are incorporated by reference herein.

BACKGROUND

Field

The present disclosure relates to a fuel-cell unit cell and its manufacturing method.

Related Art

JP2015-133269A discloses a unit cell for fuel cells. The unit cell includes an electrolyte-membrane/electrode structure, and a resin frame joined to a periphery of the electrolyte-membrane/electrode structure, which is sandwiched between an anode-side separator and a cathode-side separator. Gas manifold holes are formed in outer edge portions of the two separators, respectively, and gas flow paths are formed on respective surfaces of the two separators facing the resin-frame added electrolyte membrane/electrode structure. A plurality of guide flow paths (or gas-flow-path forming portions) that connect the gas manifold holes and the gas flow paths are formed from resin on the surface of the resin frame facing the cathode-side separator.

In the related art, when the resin frame and the two separators are joined together by thermal pressing, the gas-flow-path forming portions may be fused and deformed depending on properties of the resin of the gas-flow-path forming portions, and the deformation may cause clogging of the gas flow paths.

SUMMARY

The present disclosure, having been accomplished to solve at least part of the above-described problems, can be implemented in the following aspects.

(1) In one aspect, there is provided a fuel-cell unit cell. The fuel-cell unit cell comprises: a membrane-electrode gas-diffusion-layer assembly (MEGA) plate including an MEGA and a resin frame joined to a periphery of the MEGA; a first separator placed in contact with a first surface of the MEGA and also placed on a first-surface side of the resin frame; and a second separator placed in contact with a second surface of the MEGA and also placed on a second-surface side of the resin frame, wherein a gas manifold hole is formed in an outer edge portion of the resin frame. The fuel-cell unit cell further comprises: a gas-flow-path forming portion with a recessed-and-protruded shape, provided on the first surface of the resin frame, for forming gas flow paths between the gas manifold hole and the first surface of the MEGA; and a fusion-bonding portion for surrounding a periphery of the gas manifold hole to cut off gas circulation between the gas manifold hole and the second surface of the MEGA and for bonding the resin frame and the second separator with each other. The fusion-bonding portion is formed on the second surface of the resin frame so as to pass across a backside of the gas-flow-path forming portion. The fusion-bonding portion is formed from a first resin, and the gas-flow-path forming portion is formed from a second resin higher in melting point than the first resin.

According to the fuel-cell unit cell of this aspect, since the melting point of the gas-flow-path forming portion is higher than the melting point of the fusion-bonding portion, fusion and deformation of the gas-flow-path forming portion will be reduced in assembling of the fuel-cell unit cell, making it possible to reduce the possibility that the gas flow paths of the gas-flow-path forming portion may be clogged.

(2) In the above aspect, the resin frame may have a rectangular frame-like shape, and the gas manifold hole may be formed at four corner positions of the resin frame such that the resulting gas manifold holes includes two first gas manifold holes formed at one pair of diagonal positions of the resin frame and two second gas manifold holes formed at the other pair of diagonal positions. The gas-flow-path forming portion provided on the first surface of the resin frame may include two first gas-flow-path forming portions for forming gas flow paths between each of the two first gas manifold holes and the first surface of the MEGA. The fuel-cell unit cell may be further provided with two second gas-flow-path forming portions with a recessed-and-protruded shape for forming gas flow paths between each of the two second gas manifold holes and the second surface of the MEGA on the second surface of the resin frame. Also, independent of the fusion-bonding portion provided on the second surface of the resin frame, a first fusion-bonding portion may be formed on the first surface of the resin frame so as to pass across backsides of the two second gas-flow-path forming portions such that the first fusion-bonding portion does not cut off gas circulation between each of the two first gas manifold holes and the first surface of the MEGA while the first fusion-bonding portion surrounds each of the two second gas manifold holes to cut off gas circulation between each of the two second gas manifold holes and the first surface of the MEGA, and the first fusion-bonding portion bonds the resin frame and the first separator with each other. Moreover, the fusion-bonding portion provided on the second surface of the resin frame may include a second fusion-bonding portion which is formed so as to pass across backsides of the two first gas-flow-path forming portions such that the second fusion-bonding portion does not cut off gas circulation between each of the two second gas manifold holes and the second surface of the MEGA while the second fusion-bonding portion surrounds each of the two first gas manifold holes to cut off gas circulation between each of the two first gas manifold holes and the second surface of the MEGA, and the second fusion-bonding portion bonds the resin frame and the second separator with each other. In this case, the first fusion-bonding portion and the second fusion-bonding portion may be formed from the first resin, and the two first gas-flow-path forming portions and the two second gas-flow-path forming portions are formed from the second resin.

According to the fuel-cell unit cell of this aspect, since the two first gas-flow-path forming portions and the two second gas-flow-path forming portions are higher in melting point than the first fusion-bonding portion and the second fusion-bonding portion, fusion and deformation of each of the four gas-flow-path forming portions will be reduced in assembling of the fuel-cell unit cell, making it possible to reduce the possibility that the gas flow paths of the gas-flow-path forming portions may be clogged.

(3) In the above aspect, the two first gas-flow-path forming portions and the two second gas-flow-path forming portions may be formed at mutually non-overlapping positions when projected and observed along a stacking direction in which a plurality of the fuel-cell unit cells are to be stacked together.

According to the fuel-cell unit cell of this aspect, since the two first gas-flow-path forming portions and the two second gas-flow-path forming portions are formed at mutually non-overlapping positions when projected and observed along a stacking direction in which a plurality of the fuel-cell unit cells are to be stacked together, pressure applied to the separators will be dispersed in assembling of the fuel-cell unit cell, so that deformation of the fuel-cell unit cell will be reduced.

(4) In the above aspect, the resin frame may include an inner frame joined to a periphery of the MEGA and an outer frame joined to a periphery of the inner frame, the outer frame may be joined to the first separator and the second separator. In this case, Young's modulus of the inner frame may be smaller than Young's modulus of the outer frame.

According to the fuel-cell unit cell of this aspect, since Young's modulus of the inner frame is smaller than Young's modulus of the outer frame, the inner frame is more elastically deformable. Therefore, when the fuel-cell unit cell is used under an environment of larger temperature variations, stresses occurring to the separators and the outer frame will be relaxed by the inner frame, making it possible to reduce the possibility that the electrolyte membrane of the MEGA joined to the inner frame may be broken due to tensile stress.

(5) In the above aspect, the fuel-cell unit cell may further comprises: a seal gasket which is to be put into contact with the second separator of neighboring another fuel-cell unit cell when a plurality of the fuel-cell unit cells are to be stacked together. The seal gasket may be formed on a cooling surface out of two surfaces of the first separator, where the cooling surface is opposed to the surface which is placed on the first-surface side of the resin frame. The seal gasket may be disposed such that the seal gasket passes across a position overlapping with the gas-flow-path forming portion when projected and observed along a stacking direction in which a plurality of the fuel-cell unit cells are to be stacked together.

According to the fuel-cell unit cell of this aspect, since a seal gasket is formed to pass across a position overlapping with the gas-flow-path forming portion on the cooling surface, part of the pressure applied to the seal gasket will be received by the gas-flow-path forming portion in stacking of a plurality of fuel-cell unit cells, making it possible to reduce deformation of the fuel-cell unit cells.

(6) According to another aspect of the disclosure, there is provided a method of manufacturing a fuel-cell unit cell. The method comprises the steps of (a) preparing a membrane-electrode gas-diffusion-layer assembly (MEGA) plate including an MEGA and a resin frame joined to a periphery of the MEGA, a first separator to be placed in contact with a first surface of the MEGA and also placed on a first-surface side of the resin frame, and a second separator to be placed in contact with a second surface of the MEGA and also placed on a second-surface side of the resin frame; and (b) stacking the first separator, the MEGA plate, and the second separator to assemble the fuel-cell unit cell. In this aspect, a gas manifold hole is formed in an outer edge portion of the resin frame. A gas-flow-path forming portion with a recessed-and-protruded shape for forming gas flow paths between the gas manifold hole and the first surface of the MEGA is formed on the first surface of the resin frame. A thermoplastic bonding portion for surrounding a periphery of the gas manifold hole to cut off gas circulation between the gas manifold hole and the second surface of the MEGA and for bonding the resin frame and the second separator with each other is formed on the second surface of the resin frame so as to pass across a backside of the gas-flow-path forming portion. The thermoplastic bonding portion is formed from a first resin and the gas-flow-path forming portion is formed from a second resin higher in melting point than the first resin. The step (b) includes a step of, after the stacking, compressing the gas-flow-path forming portion and the thermoplastic bonding portion of the resin frame from outside of the first separator and the second separator while heating the gas-flow-path forming portions and the thermoplastic bonding portion at a temperature which is not lower than a melting point of the thermoplastic bonding portion and also which is lower than a melting point of the gas-flow-path forming portion so as to fuse the thermoplastic bonding portion to form a fusion-bonding portion bonded to the second separator.

According to the method of this aspect, in assembling of the fuel-cell unit cell, since the gas-flow-path forming portion and the thermoplastic bonding portion are compressed and heated at a temperature which is not lower than the melting point of the thermoplastic bonding portion and which is lower than the melting point of the gas-flow-path forming portion, fusion and deformation of the gas-flow-path forming portion will be reduced, making it possible to reduce the possibility that the gas flow paths of the gas-flow-path forming portion may be clogged.

The present disclosure may also be implemented in various modes other than the above-described aspects. For example, the disclosure can be implemented in such modes as fuel cells, fuel cell manufacturing methods, fuel cell systems, fuel cell vehicles, and fuel cell vehicle manufacturing methods.

DESCRIPTION OF THE EMBODIMENTS

First Embodiment

Figure 1:
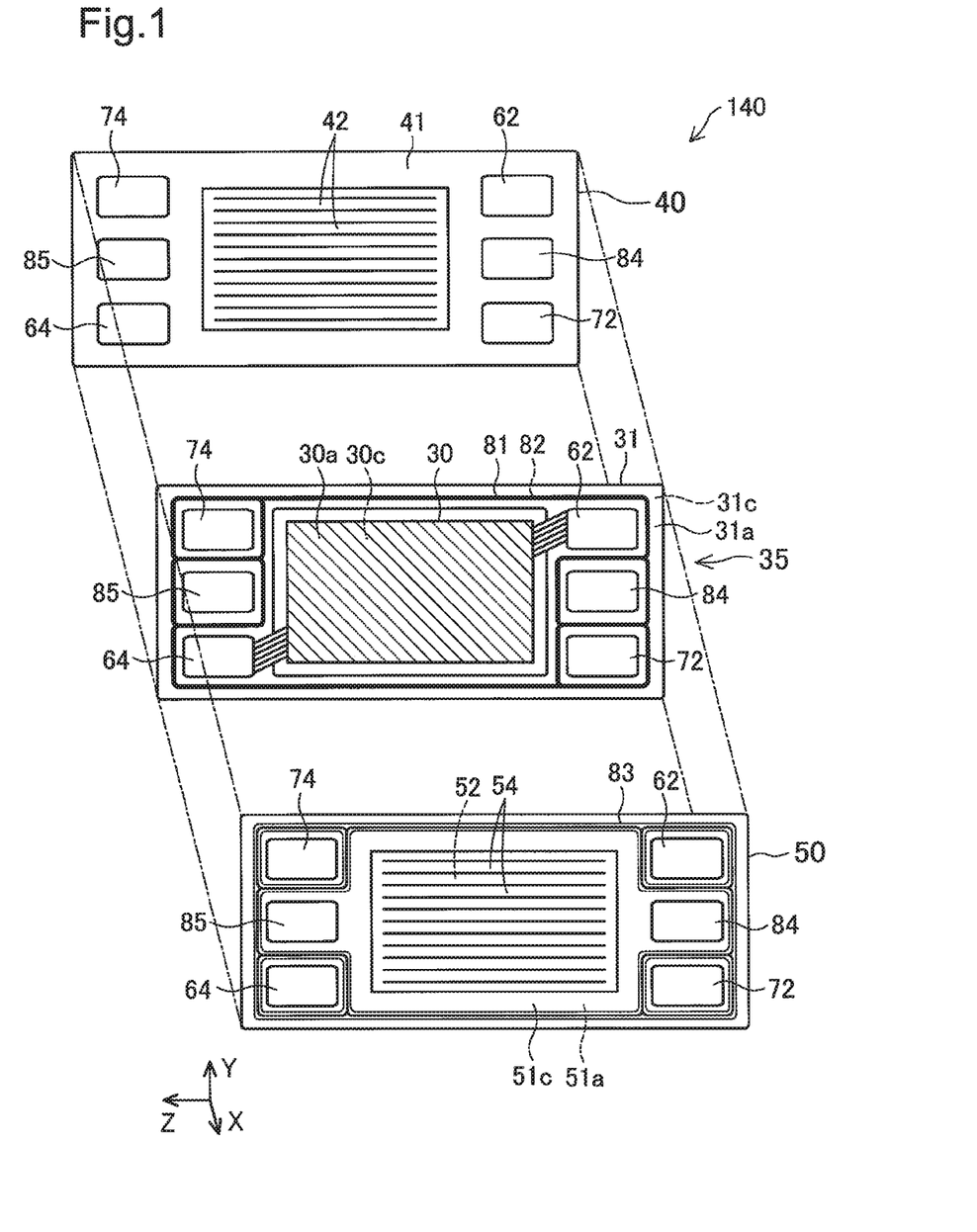
FIG. 1 illustrates a fuel-cell unit cell, as it is exploded, according to a first embodiment of the disclosure.

FIG. 1 is an explanatory view showing a fuel-cell unit cell 140, as it is exploded, according to a first embodiment of the disclosure. The fuel-cell unit cell 140 is, for example, a solid polymer type fuel cell. A fuel cell stack in which this fuel-cell unit cell 140 is stacked in plurality is to be mounted, for example, on a fuel cell vehicle as a power source. Herein, a stacking direction of the fuel-cell unit cells 140 is an X direction, and a horizontal direction is a Z direction. In addition, a direction perpendicular to the stacking direction X and the horizontal direction Z is a vertical direction Y.

The fuel-cell unit cell 140 is so configured that a Membrane-Electrode Gas-diffusion-layer Assembly (hereinafter, referred to as 'MEGA') plate 35, which includes a MEGA 30 and a resin frame 31 joined to a periphery of the MEGA 30, is sandwiched by a first separator 50 and a second separator 40. In the first embodiment, the first separator 50 is an anode-side separator, and the second separator 40 is a cathode-side separator. The MEGA 30 has a first surface 30a and a second surface 30b. The first surface 30a, which is to be in contact with the first separator 50, serves as an anode electrode. The second surface 30c, which is to be in contact with the second separator 40, serves as a cathode electrode. It is noted that the anode side and the cathode side may be reversed.

The first separator 50 is placed in contact with the first surface 30a of the MEGA 30 and also placed on a first surface 31a side of the resin frame 31. The first separator 50 is joined to the first surface 31a of the resin frame 31 with a first fusion-bonding portion 81. On a surface 51a of the first separator 50A, which is in contact with the MEGA plate 35, there are formed anode gas flow paths 52 by stripe-like recesses and protrusions. On a cooling surface 51c, which is a backside of the surface 51a, there are formed cooling medium flow paths 54 at reverse-side positions corresponding to the anode gas flow paths 52. Also on the cooling surface 51c, there is formed a seal gasket 83, which is to be in contact with the second separator 40 of a neighboring fuel-cell unit cell 140 for sealing a cooling medium in a state where a plurality of fuel-cell unit cells 140 are stacked together. The second separator 40 is placed in contact with the second surface 30c of the MEGA 30 and also placed on a second surface 31c (a backside of the first surface 31a) side of the resin frame 31. The second separator 40 is joined to the second surface 31c of the resin frame 31 with a second fusion-bonding portion 82. On a surface 41 of the second separator 40, which is to be in contact with the MEGA plate 35, there are formed cathode gas flow paths 42 by stripe-like recesses and protrusions. Gas manifold holes 62, 64, 72, 74 and cooling medium manifold holes 84, 85 are formed in outer edge portions of the first separator 50, the MEGA plate 35, and the second separator 40, respectively.

Figure 2:
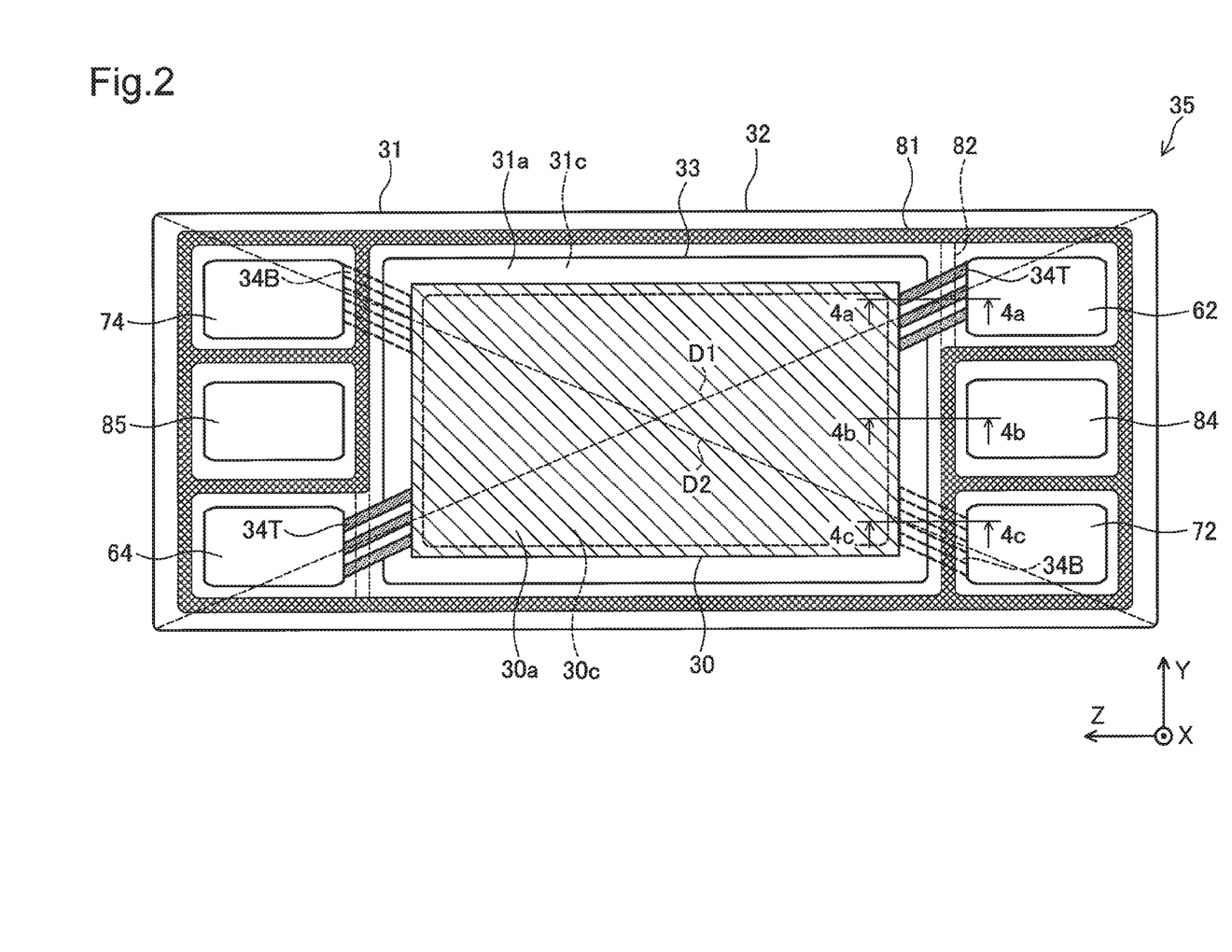
FIG. 2 is a plan view of an MEGA plate.

FIG. 2 is a plan view of the MEGA plate 35. The resin frame 31, which has a rectangular frame shape as a whole, includes a rectangular frame-shaped inner frame 33 joined to the periphery of the MEGA 30, and an outer frame 32 joined to the periphery of the inner frame 33. The gas manifold holes 62, 64, 72, 74 are formed at four corner positions of the resin frame 31, respectively, and at four corners of the outer frame 32 in this embodiment. The two first gas manifold holes 62, 64 are formed at a pair of diagonal positions on a first diagonal line D1 of the resin frame 31. The two second gas manifold holes 72, 74 are formed at the other pair of diagonal positions on a second diagonal line D2 intersecting the first diagonal line D1. In the first embodiment, anode gas flows into the anode side (first surface 30a) of the MEGA 30 through the first gas manifold hole 62 for gas-supply use, passing through the anode gas flow paths 52 (FIG. 1) and then, after gathered to the first gas manifold hole 64 for gas-discharge use, discharged to outside of the fuel-cell unit cell 140 (FIG. 1). Cathode gas flows into the cathode side (second surface 30c) of the MEGA 30 through the second gas manifold hole 72 for gas-supply use, passing through the cathode gas flow paths 42 (FIG. 1) and then, after gathered to the second gas manifold hole 74 for gas-discharge use, discharged to outside of the fuel-cell unit cell 140.

On the first surface 31a of the resin frame 31, there are formed two first gas-flow-path forming portions 34T with recesses and protrusions for allowing the anode gas to pass through; their protruded portions protruding in the X-direction are hatched for drawing convenience' sake. One of the two first gas-flow-path forming portions 34T forms gas flow paths between the first gas manifold hole 62 for gas-supply use and the first surface 30a of the MEGA 30 while the other forms gas flow paths between the first gas manifold hole 64 for gas-discharge use and the first surface 30a of the MEGA 30.

On the second surface 31c of the resin frame 31, there are formed two second gas-flow-path forming portions 34B with recesses and protrusions for allowing the cathode gas to pass through. The two second gas-flow-path forming portions 34B are identical in shape and size to the two first gas-flow-path forming portions 34T. One of the two second gas-flow-path forming portions 34B forms gas flow paths between the second gas manifold hole 72 for gas-supply use and the second surface 30c of the MEGA 30 while the other forms gas flow paths between the second gas manifold hole 74 for gas-discharge use and the second surface 30c of the MEGA 30. In this embodiment, the two first gas-flow-path forming portions 34T and the two second gas-flow-path forming portions 34B are formed at mutually non-overlapping positions when the MEGA plate 35 is projected and observed along the stacking direction X. With such arrangement, when the two separators 40, 50 are compressed from outside in assembling of the fuel-cell unit cell 140, pressure applied to the separators 40, 50 will be dispersed, so that deformation of the fuel-cell unit cell 140 will be suppressed. The first gas-flow-path forming portions 34T and the second gas-flow-path forming portions 34B, however, may partly or entirely be placed at mutually overlapping positions.

There is further formed a first fusion-bonding portion 81 integrally on the first surface 31a of the resin frame 31. The first fusion-bonding portion 81, which is also protruded in the X direction, is hatched. The first fusion-bonding portion 81 surrounds peripheries of the two second gas manifold holes 72, 74, respectively, to cut off circulation of the cathode gas between the second gas manifold holes 72, 74 and the first surface 30a of the MEGA 30 while bonding the resin frame 31 and the first separator 50 (FIG. 1) with each other. The first fusion-bonding portion 81 is so provided as to pass across backside of the two second gas-flow-path forming portions 34B. The first fusion-bonding portion 81 also surrounds the cooling medium manifold holes 84, 85, individually, to seal the cooling medium. In order to seal the anode gas, the first fusion-bonding portion 81 is so provided as to surround an anode gas flow-path region containing the two first gas manifold holes 62, 64 and the first surface 30a of the MEGA 30. The first fusion-bonding portion 81 is not formed between each of the two first gas manifold holes 62, 64 and the first surface 30a of the MEGA 30 so as not to cut off the gas circulation therebetween.

There is further formed a second fusion-bonding portion 82 integrally on the second surface 31c of the resin frame 31. The second fusion-bonding portion 82 has a shape obtained by turning the first fusion-bonding portion 81 to a left-right 180° turn. That is, the second fusion-bonding portion 82 is formed so as to surround the two first gas manifold holes 62, 64 individually, thereby cutting off circulation of the anode gas between the first gas manifold holes 62, 64 and the second surface 30c of the MEGA 30, and moreover bonding the resin frame 31 and the second separator 40 (FIG. 1) with each other. The second fusion-bonding portion 82 is so provided as to pass across backside of the two first gasflow-path forming portions 34T. the second fusion-bonding portion 82 surrounds the cooling medium manifold holes 84, 85 individually to seal the cooling medium. In order to seal the cathode gas, the second fusion-bonding portion 82 is provided so as to surround the cathode gas flow-path region containing the two second gas manifold holes 72, 74 and the second surface 30c of the MEGA 30. The second fusion-bonding portion 82 is not formed between each of the two second gas manifold holes 72, 74 and the second surface 30c of the MEGA 30 so as not to cut off the gas circulation therebetween.

The gas-flow-path forming portions 34T, 34B and the fusion-bonding portions 81, 82 are formed from mutually different resins. For example, the fusion-bonding portions 81, 82 may be formed from a resin such as adhesive thermoplastic resin containing a maleic anhydride-modified polypropylene (or modified PP). The gas-flow-path forming portions 34T, 34B may be formed from a resin such as an olefinic resin containing, in part or in entirety, polypropylene (PP), polyethylene (PE), and ethylene propylene diene terpolymer (EPDM). These resin materials are selected in order that the melting point of a first resin for forming the gas-flow-path forming portions 34T, 34B is higher than the melting point of a second resin for forming the fusion-bonding portions 81, 82.

Figure 3A:
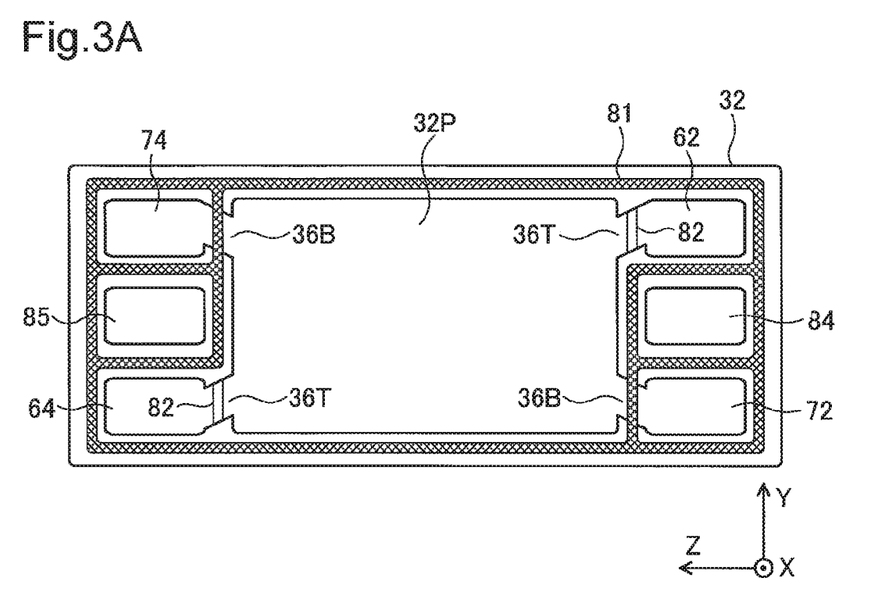
FIGS. 3A-3B illustrate an outer frame and an inner frame of a resin frame.
Figure 3B:
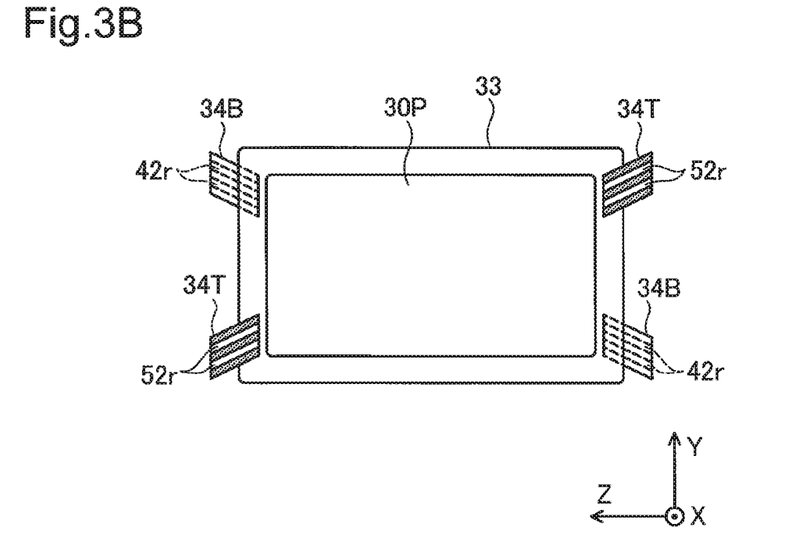

FIGS. 3A and 3B are explanatory views showing the resin frame 31 as it is exploded into the outer frame 32 and the inner frame 33. FIG. 3A is a plan view of the outer frame 32. In this example, the outer frame 32 is molded integrally with the first fusion-bonding portion 81 and the second fusion-bonding portion 82 from the same material as theirs. An opening 32P into which the inner frame 33 is to be fitted is provided in the center of the outer frame 32. Cutout portions 36T at which the outer frame 32 is cut out are formed between the opening 32P and the two first gas manifold holes 62, 64, respectively. Side edges of the cutout portions 36T are joined to the first gas-flow-path forming portions 34T while in contact with side edges of the first gas-flow-path forming portions 34T. In the state after this junction, the bottom surface of the second fusion-bonding portion 82 is joined to the backside of the first gas-flow-path forming portions 34T. Also between the opening 32P and the two second gas manifold holes 72, 74, respectively, cutout portions 36B at which the outer frame 32 is cut out are provided. Side edges of the cutout portions 36B are joined to the second gas-flow-path forming portions 34B while in contact with side edges of the second gas-flow-path forming portions 34B. In the state after this junction, the bottom surface of the first fusion-bonding portion 81 is joined to the backside of the second gas-flow-path forming portions 34B.

FIG. 3B is a plan view of the inner frame 33. An MEGA opening 30P to which the MEGA 30 is to be joined is formed in the center of the inner frame 33. In this example, the inner frame 33 is molded integrally with the two first gas-flow-path forming portions 34T and the two second gas-flow-path forming portions 34B from the same material as theirs. Gas guide flow paths 52r, which are recessed grooves, are formed at the first gas-flow-path forming portions 34T. Similarly, gas guide flow paths 42r, which are recessed grooves, are formed also at the second gas-flow-path forming portions 34B. These gas guide flow paths 52r, 42r are preferably provided in a plurality such as two or more, whereas only two flow paths are depicted in FIGS. 3A and 3B for drawing convenience' sake. The resin frame 31 (FIG. 2) may formed in a two-color molding process such that the fusion-bonding portions 81, 82 and the outer frame 32 are integrally molded from an identical first resin while the gas-flow-path forming portions 34T, 34B and the inner frame 33 are integrally molded from a second resin which is different from the first resin.

Figure 4A:
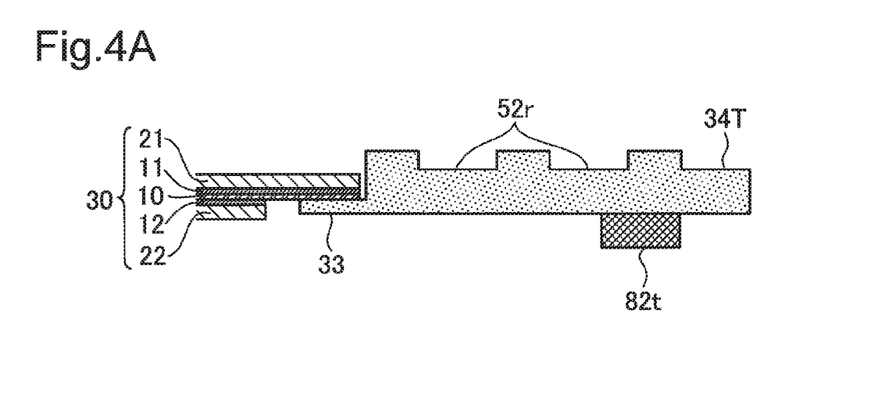
FIGS. 4A-4C are sectional views of the MEGA plate according to the first embodiment.
Figure 4B:
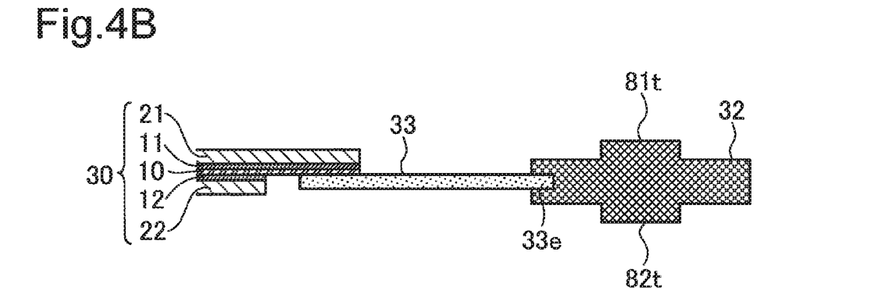
Figure 4C:
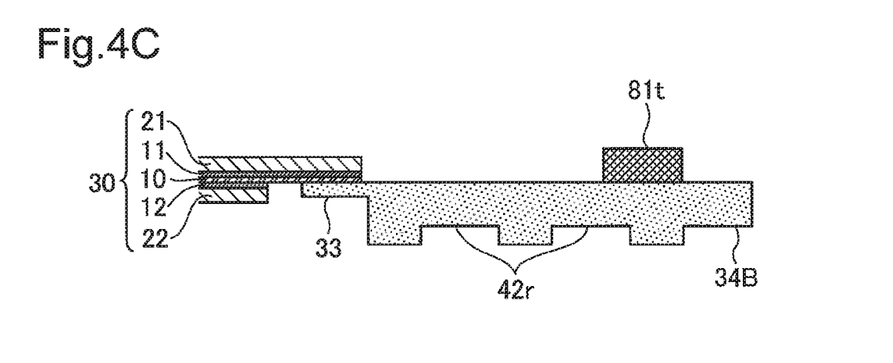

FIGS. 4A-4C are explanatory views showing a 4a-4a cross section, a 4b-4b cross section and a 4c-4c cross section of the MEGA plate 35 shown in FIG. 2. Here are shown states before the fuel-cell unit cell 140 is assembled. In the state before the fuel-cell unit cell 140 is assembled, the first fusion-bonding portion 81 and the second fusion-bonding portion 82 shown in FIG. 2 have not yet been fused, so they are referred to as a first thermoplastic bonding portion 81t and a second thermoplastic bonding portion 82t.

As shown in FIG. 4A, the first gas-flow-path forming portions 34T have a recessed-and-protruded shape to form gas guide flow paths 52r for the anode gas. In this example, the first gas-flow-path forming portions 34T are integrally molded from the same material as the inner frame 33 of the resin frame 31 (FIG. 2). The second thermoplastic bonding portion 82t passes across backside of the first gas-flow-path forming portions 34T. As shown in FIG. 4B, the thermoplastic bonding portions 81t, 82t are integrally molded from the same material as the outer frame 32 of the resin frame 31. Preferably, an end portion 33e of the inner frame 33 joined to the outer frame 32 is joined so as to be contained in and surrounded by the outer frame 32. With this structure, three end faces of the end portion 33e of the inner frame 33 are in contact with the outer frame 32, so that the inner frame 33 and the outer frame 32 are firmly joined together. As shown in FIG. 4C, the second gas-flow-path forming portions 34B have a recessed-and-protruded shape to form gas guide flow paths 42r for the cathode gas. The second gas-flow-path forming portions 34B are molded integrally with the inner frame 33 of the resin frame 31 from the same material. The first thermoplastic bonding portion 81t passes across backside of the second gas-flow-path forming portions 34B.

As shown in FIGS. 4A-4C, the MEGA 30 joined to the inner frame 33 is configured such that electrode catalyst layers 11, 12 formed on opposite surfaces of an electrolyte membrane 10 are sandwiched by gas diffusion layers 21, 22. In this example, the first electrode catalyst layer 11 is one size larger than the second electrode catalyst layer 12, and the first gas diffusion layer 21 is one size larger than the second gas diffusion layer 22. However, the first electrode catalyst layer 11 and the second electrode catalyst layer 12 may be of the same size, and the first gas diffusion layer 21 and the second gas diffusion layer 22 may be of the same size. In the first embodiment, the first electrode catalyst layer 11 is an anode-electrode catalyst layer, and the second electrode catalyst layer 12 is a cathode-electrode catalyst layer. In the MEGA 30, out of two surfaces of the electrolyte membrane 10, one surface opposite to the surface in contact with the first electrode catalyst layer 11 is joined to the inner frame 33 of the resin frame 31 (FIG. 2) with adhesive.

Preferably, Young's modulus of the inner frame 33 is smaller than Young's modulus of the outer frame 32. With this configuration, when the fuel-cell unit cell 140 (FIG. 1) is used under an environment of large temperature variations, stresses occurring to the separators 40, 50 (FIG. 1) and the outer frame 32 can be relaxed by the inner frame 33 by virtue of high elastic deformability of the inner frame 33, thereby reducing the possibility that the electrolyte membrane 10 of the MEGA 30 joined to the inner frame 33 may be broken by tensile stress.

Figure 5A:
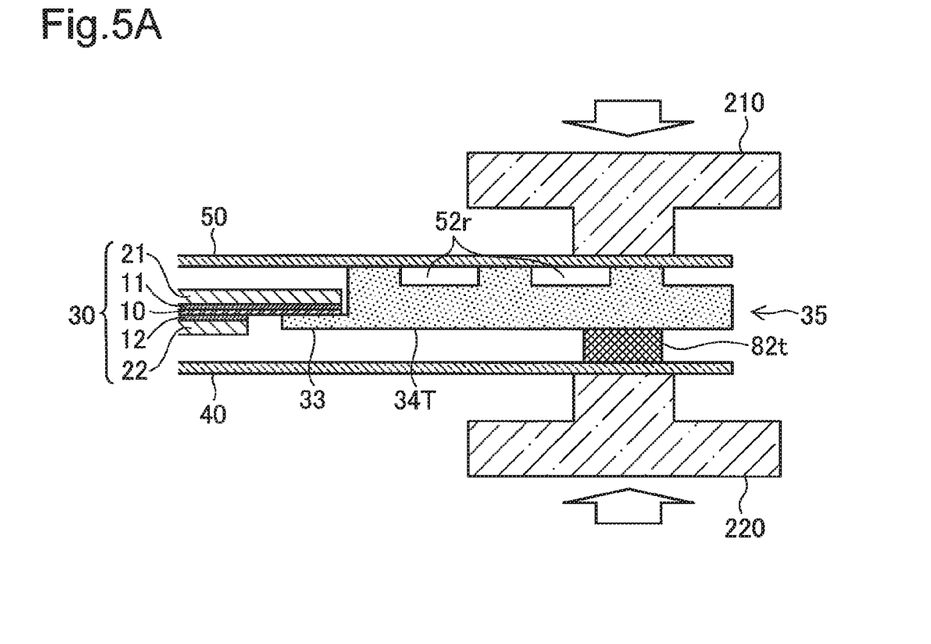
FIGS. 5A-5B illustrate a manufacturing method of the fuel-cell unit cell.
Figure 5B:
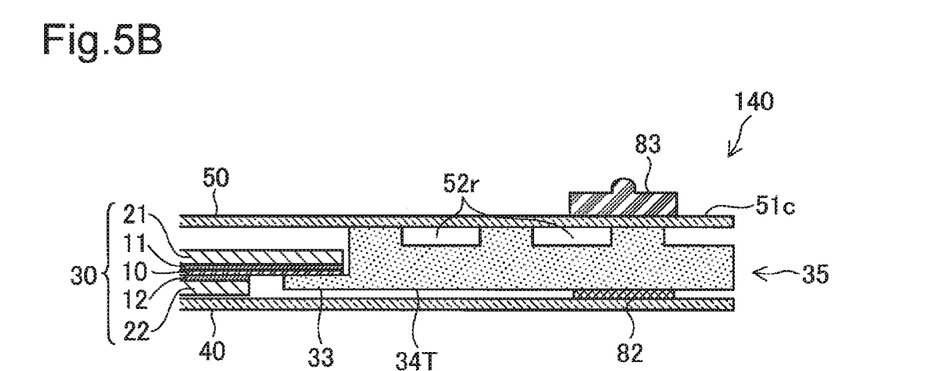

FIGS. 5A and 5B are explanatory views showing a manufacturing method of the fuel-cell unit cell 140; the explanation will be given by using the cross section of FIG. 4A. First, the MEGA plate 35, the first separator 50, and the second separator 40 are prepared. The separators 40, 50 are press-formed plates in which the gas flow paths 42, 52 and the cooling medium flow paths 54 have been formed by press forming of metal plates, for example. It is noted that recesses and protrusions of the separators 40, 50 are omitted in FIGS. 5A and 5B.

As shown in FIG. 5A, the first separator 50, the MEGA plate 35 and the second separator 40, which have been prepared, are stacked together to form a stacked assembly. Next, a first jig 210 is set in contact with an outer position of the first separator 50 corresponding to the position of the first gas-flow-path forming portion 34T, and a second jig 220 is set in contact with an outer position of the second separator 40 corresponding to the position of the second thermoplastic bonding portion 82t. As indicated by hollow arrows, the first gas-flow-path forming portion 34T and the second thermoplastic bonding portion 82t are compressed while pinched by the jigs 210, 220. In this process, the jigs 210, 220 are heated with an unshown heater so that the first gas-flow-path forming portion 34T and the second thermoplastic bonding portion 82t are heated at a temperature which is not lower than the melting point of the second thermoplastic bonding portion 82t and which is lower than the melting point of the first gas-flow-path forming portion 34T. For example, given that the melting point of the second thermoplastic bonding portion 82t is 135° C. and that the melting point of the first gas-flow-path forming portion 34T is 160° C., the heating temperature is not lower than 135° C. and lower than 160° C. (where heat loss is not considered). With this setting, the second thermoplastic bonding portion 82t is fused or melted to form the second fusion-bonding portion 82 bonded to the second separator 40, as shown in FIG. 5B. In this way, the MEGA plate 35 and the second separator 40 are bonded together. Similarly, by compressing and heating the second gas-flow-path forming portion 34B and the first thermoplastic bonding portion 81t shown in FIG. 4C in a similar manner, the first fusion-bonding portion 81 is formed so that the MEGA plate 35 and the first separator 50 are bonded together. Finally, the seal gasket 83 is bonded to the outer cooling surface 51c of the first separator 50 with adhesive, for example. As a result of this, the assembly of the fuel-cell unit cell 140 is completed. Preferably, the seal gasket 83 extends to pass across positions overlapping with the first gas-flow-path forming portion 34T when projected and observed in the stacking direction of the fuel-cell unit cell 140. With this arrangement, when a plurality of fuel-cell unit cells 140 are stacked together, part of pressure applied to the seal gasket 83 will be received by the first gas-flow-path forming portion 34T, thereby reducing deformation of the fuel-cell unit cells 140.

As described above, in the first embodiment, since the melting point of the gas-flow-path forming portions 34T, 34B is higher than the melting point of the thermoplastic bonding portions 81t, 82t (or fusion-bonding portions 81, 82), the gas-flow-path forming portions 34T, 34B are prevented from being excessively fused or deformed, so that the possibility of clogging of the gas guide flow paths 52r, 42r (or gas flow paths) will be reduced in the assembly of the fuel-cell unit cell 140.

Second Embodiment

Figure 6A:
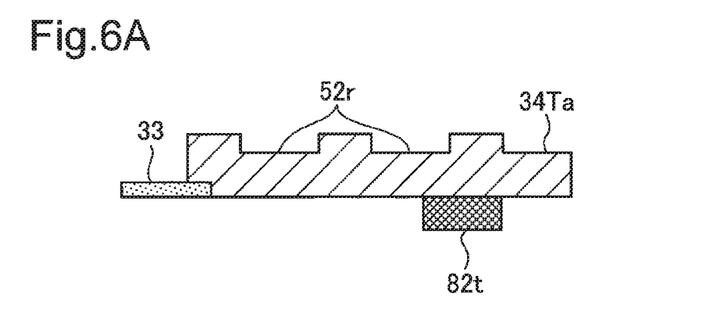
FIGS. 6A-6C are sectional views of an MEGA plate according to a second embodiment.
Figure 6B:
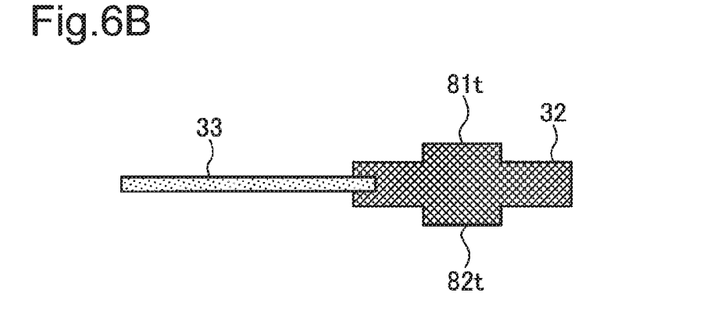
Figure 6C:
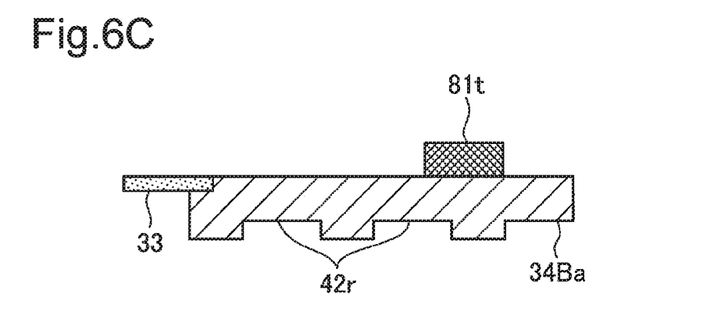

FIGS. 6A-6C are explanatory views showing a second embodiment, corresponding to FIGS. 4A-4C of the first embodiment. For drawing convenience' sake, the MEGA 30 is omitted. This embodiment differs from the first embodiment shown in FIGS. 4A-4C only in the materials for forming gas-flow-path forming portions 34Ta, 34Ba, the rest of the constitution being the same as in the first embodiment. As shown in FIG. 6A and FIG. 6C, the gas-flow-path forming portions 34Ta, 34Ba are formed from a material different from that of the inner frame 33 of the resin frame 31 (FIG. 2). The resin frame 31, which includes the gas-flow-path forming portions 34Ta, 34Ba, the inner frame 33, and the outer frame 32 having the thermoplastic bonding portions 81t, 82t integrally molded therewith, may be formed by three-color molding process, for example.

Also in the second embodiment, resin materials of these members are selected such that the melting point of the gas-flow-path forming portions 34Ta, 34Ba is higher than the melting point of the thermoplastic bonding portions 81t, 82t (or fusion-bonding portions 81, 82). Therefore, as in the first embodiment, the gas-flow-path forming portions 34Ta, 34Ba are prevented from being excessively fused or deformed, thereby reducing the possibility of clogging of the gas guide flow paths 52r, 42r in the assembly of the fuel-cell unit cell 140.

Third Embodiment

Figure 7A:
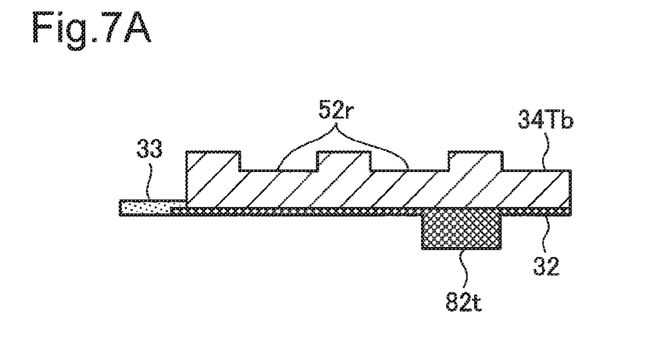
FIGS. 7A-7C are sectional views of an MEGA plate according to a third embodiment.
Figure 7B:
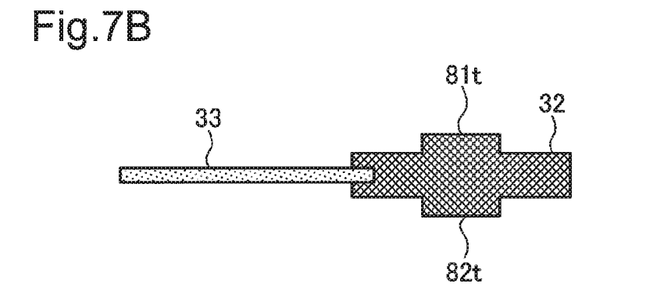
Figure 7C:
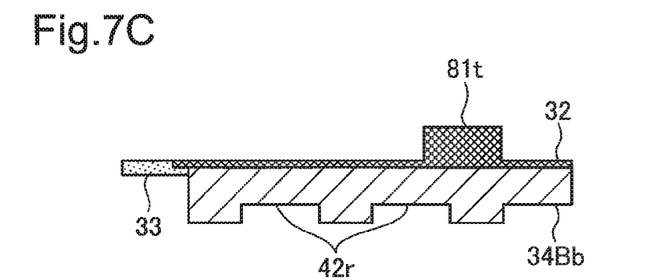

FIGS. 7A-7C are explanatory views showing a third embodiment, corresponding to FIGS. 6A-6C of the second embodiment. This embodiment differs from the second embodiment shown in FIGS. 6A-6C only in the joining method of gas-flow-path forming portions 34Tb, 34Bb with the outer frame 32 of the resin frame 31 (FIG. 2), the rest of the constitution being similar to that of the second embodiment.

Figure 8A:
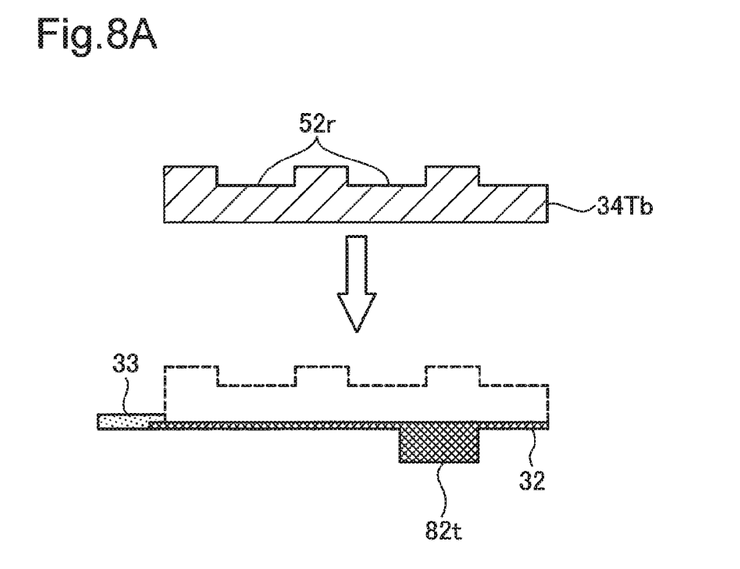
FIGS. 8A-8B illustrate a step of joining a gas-flow-path forming portion to the outer frame in the third embodiment.
Figure 8B:
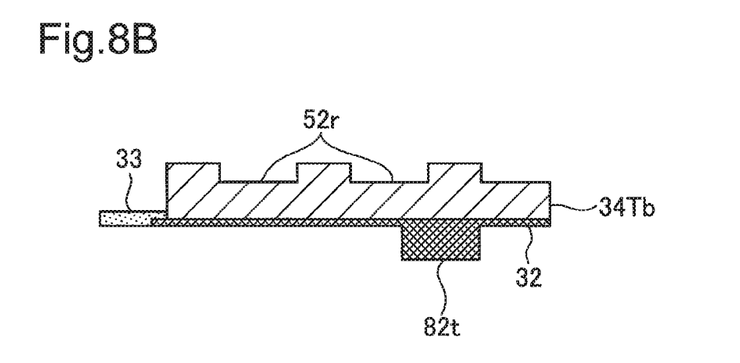

FIGS. 8A-8C illustrate how a first gas-flow-path forming portion 34Tb is joined to the outer frame 32 by using the cross section of FIG. 7A as an example. As shown in FIG. 8A, first, the inner frame 33, and the outer frame 32 with which the second thermoplastic bonding portion 82t is integrally molded, are made by two-color molding process. The first gas-flow-path forming portion 34Tb is modeled separately. Then, the first gas-flow-path forming portion 34Tb is set into contact with the outer frame 32 and joined to the outer frame 32 with heat treatment or adhesive, whereby a cross section of FIG. 8B is obtained. As can be understood from this example, the resin frame does not need to be integrally molded as the whole, and a plurality of members of the resin frame, after molded independently, may be joined together.

Modifications

The present disclosure is not limited to the above-described embodiments, and may be carried out in other various modes unless those modes depart from the gist of the disclosure, the other modes exemplified by the following modifications.

Modification 1

In the foregoing embodiments, a total of four gas-flow-path forming portions 34T, 34B and two fusion-bonding portions 81, 82 are formed in the resin frame 31. However, these gas-flow-path forming portions 34T, 34B and fusion-bonding portions 81, 82 may be partly omitted. In this case, a separator to be put into contact with that surface of the resin frame 31 which is not provided with the fusion-bonding portion may be joined to the resin frame 31 by means of other adhesive or bonding portion, or otherwise may be non-joined with the resin frame 31. It is preferable, however, that at least one gas-flow-path forming portion is provided on one surface (or first surface) out of the two surfaces of the resin frame 31 while a fusion-bonding portion is provided on its reverse surface.

What is claimed is:

1. A method of manufacturing a fuel-cell unit cell comprising the steps of:
    (a) preparing a membrane-electrode gas-diffusion-layer assembly (MEGA) plate including an MEGA portion and a resin frame joined to a periphery of the MEGA portion, a first separator to be placed in contact with a first surface of the MEGA portion and also placed on a first-surface side of the resin frame, and a second separator to be placed in contact with a second surface of the MEGA portion and also placed on a second-surface side of the resin frame;
    (b) forming a gas manifold hole in an outer edge portion of the resin frame,
    (c) forming a gas-flow-path forming portion on the first-surface side of the resin frame, the gas-flow-path forming portion comprising recesses and protrusions extending from the gas manifold hole to the first surface of the MEGA portion for forming gas flow paths between the gas manifold hole and the first surface of the MEGA portion,
    (d) forming a thermoplastic bonding portion for surrounding a periphery of the gas manifold hole to cut off gas circulation between the gas manifold hole and the second surface of the MEGA portion and for bonding the resin frame and the second separator with each other formed on the second-surface side of the resin frame so as to pass across a backside of the gas-flow-path forming portion,
    (e) stacking the first separator, the MEGA plate, and the second separator to assemble the fuel-cell unit cell,
    wherein the thermoplastic bonding portion is made of a first resin and the gas-flow-path forming portion is made of a second resin that has a higher in melting point than the first resin,
    wherein the thermoplastic bonding portion is directly joined to a back face of the gas-flow-path forming portion; and
    the step (e) includes a step of, after the stacking, compressing the gas-flow-path forming portion and the thermoplastic bonding portion of the resin frame from outside of the first separator and the second separator while heating the gas-flow-path forming portions and the thermoplastic bonding portion at a temperature which is not lower than a melting point of the thermoplastic bonding portion and also which is lower than a melting point of the gas-flow-path forming portion so as to fuse the thermoplastic bonding portion to form a fusion-bonding portion bonded to the second separator;
    wherein the resin frame has a rectangular shape,
    the four gas manifold holes are formed at four corner positions of the resin frame, the resulting gas manifold holes including two first gas manifold holes formed at one pair of diagonal positions of the resin frame and two second gas manifold holes formed at the other pair of diagonal positions,
    the gas-flow-path forming portion provided on the first-surface side of the resin frame includes two first gas-flow-path forming portions for forming gas flow paths between each of the two first gas manifold holes and the first surface of the MEGA portion,
    the resin frame is further provided with two second gas-flow-path forming portions with a recessed-and-protruded shape for forming gas flow paths between each of the two second gas manifold holes and the second surface of the MEGA portion on the second surface of the resin frame,
    independent of the thermoplastic bonding portion provided on the second-surface side of the resin frame, a first thermoplastic bonding portion is formed on the first-surface side of the resin frame so as to pass across backsides of the two second gas-flow-path forming portions such that the first thermoplastic bonding portion does not cut off gas circulation between each of the two first gas manifold holes and the first surface of the MEGA portion while the first thermoplastic bonding portion surrounds each of the two second gas manifold holes to cut off gas circulation between each of the two second gas manifold holes and the first surface of the MEGA, and the first thermoplastic bonding portion is used to bond the resin frame and the first separator with each other,
    the thermoplastic bonding portion provided on the second-portion side of the resin frame includes a second thermoplastic bonding portion which is formed so as to pass across backsides of the two first gas-flow-path forming portions such that the second thermoplastic bonding portion does not cut off gas circulation between each of the two second gas manifold holes and the second surface of the MEGA portion while the second thermoplastic bonding portion surrounds each of the two first gas manifold holes to cut off gas circulation between each of the two first gas manifold holes and the second surface of the MEGA portion, and the second thermoplastic bonding portion is used to bond the resin frame and the second separator with each other, and
    the first thermoplastic bonding portion and the second thermoplastic bonding portion are made of the first resin, and the two first gas-flow-path forming portions and the two second gas-flow-path forming portions are made of the second resin.

2. The method in accordance with claim 1, wherein the two first gas-flow-path forming portions and the two second gas-flow-path forming portions are formed at mutually non-overlapping positions when projected and observed along a stacking direction in which a plurality of fuel-cell unit cells are to be stacked together.

3. The method in accordance with claim 1, wherein the resin frame includes an inner frame joined to a periphery of the MEGA portion and an outer frame joined to a periphery of the inner frame,
    the outer frame is joined to the first separator and the second separator, and
    Young's modulus of the inner frame is smaller than Young's modulus of the outer frame.

4. The method in accordance with claim 1, wherein the first separator includes a seal gasket which is to be put into contact with the second separator of neighboring another fuel-cell unit cell when a plurality of the fuel-cell unit cells are to be stacked together, the seal gasket being formed on a cooling surface out of two surfaces of the first separator, the cooling surface being opposed to the surface which is placed on the first-surface side of the resin frame, the seal gasket being disposed such that the seal gasket passes across a position overlapping with the gas-flow-path forming portion when projected and observed along a stacking direction in which a plurality of fuel-cell unit cells are to be stacked together.

* * * * *